US012576490B2

(12) United States Patent
Sutherland

(10) Patent No.: US 12,576,490 B2
(45) Date of Patent: Mar. 17, 2026

(54) POWERED FASTENER DRIVER WITH BUTTON CAP DELIVERY

(71) Applicant: TECHTRONIC CORDLESS GP, Anderson, SC (US)

(72) Inventor: Scott A. Sutherland, Greenville, SC (US)

(73) Assignee: Techtronic Cordless GP, Anderson, SC (US)

( * ) Notice: Subject to any disclaimer, the term of this patent is extended or adjusted under 35 U.S.C. 154(b) by 89 days.

(21) Appl. No.: 18/764,527

(22) Filed: Jul. 5, 2024

(65) Prior Publication Data

US 2025/0025994 A1 Jan. 23, 2025

Related U.S. Application Data

(60) Provisional application No. 63/514,688, filed on Jul. 20, 2023.

(51) Int. Cl.
*B25C 1/04* (2006.01)
*B25C 1/00* (2006.01)

(52) U.S. Cl.
CPC .............. *B25C 1/041* (2013.01); *B25C 1/001* (2013.01); *B25C 1/008* (2013.01); *B25C 1/047* (2013.01)

(58) Field of Classification Search
CPC ......... B25C 1/041; B25C 1/001; B25C 1/008; B25C 1/047; B25C 1/005
See application file for complete search history.

(56) References Cited

U.S. PATENT DOCUMENTS

2003/0015565 A1* 1/2003 Lee ........................ B25C 5/1693 227/18
2009/0114697 A1 5/2009 Gross et al.
2020/0306941 A1* 10/2020 Akiba ........................ B25C 1/04
2023/0122029 A1 4/2023 Bierdeman et al.

OTHER PUBLICATIONS

Extended European Search Report for Application No. 24186757.1 dated Apr. 14, 2025 (5 pages).

* cited by examiner

*Primary Examiner* — Veronica Martin
(74) *Attorney, Agent, or Firm* — Michael Best & Friedrich LLP

(57) ABSTRACT

A powered fastener driver includes a housing, a nosepiece, a driver blade movable within the nosepiece between a ready position and a driven position, a piston coupled to the driver blade, a driver cylinder within which the piston is movable, a storage chamber cylinder containing pressurized gas therein and in fluid communication with the driver cylinder, a lifting mechanism for moving the driver blade to the ready position, and a motor coupled to the lifting mechanism to drive the lifting mechanism. An onboard air compressor is driven by the motor and is driven while the lifting mechanism is driven. A feed system is in fluid communication with the onboard air compressor and includes a primary feed mechanism adjacent the nosepiece and a secondary feed mechanism adjacent the nosepiece. The primary feed mechanism and the secondary feed mechanism are actuated by compressed air received from the onboard air compressor.

21 Claims, 11 Drawing Sheets

POWERED FASTENER DRIVER WITH BUTTON CAP DELIVERY

CROSS-REFERENCE TO RELATED APPLICATIONS

This application claims priority to U.S. Provisional Patent Application No. 63/514,688 filed on Jul. 20, 2023, the entire content of which is incorporated herein by reference.

FIELD OF THE DISCLOSURE

The present disclosure relates to powered fastener drivers, and more particularly to powered fastener drivers that simultaneously deliver button caps.

BACKGROUND OF THE DISCLOSURE

Powered fastener drivers are used for driving fasteners (e.g., nails, tacks, staples, etc.) into a workpiece. Such fastener drivers typically include a magazine in which the fasteners are stored and a pusher mechanism for individually transferring fasteners from the magazine to a fastener driving channel, where the fastener is impacted by a driver blade during a fastener driving operation. For certain applications that include an underlayment, such as roofing felt, house wrap, foam insulation board, etc., it is necessary to include button caps through which the fasteners are driven. Each button cap extends the surface area of the head of the fastener to prevent the fastener from punching through the underlayment and to prevent the underlayment from tearing away from the worksurface, e.g., due to high winds, after it is installed and prior to the exterior sheathing being installed thereover.

SUMMARY OF THE DISCLOSURE

The present disclosure provides, in one aspect, a powered fastener driver having a housing, a nosepiece extending from the housing, a driver blade movable within the nosepiece between a ready position and a driven position, a piston coupled to the driver blade for movement therewith, a driver cylinder within which the piston is movable, a storage chamber cylinder containing pressurized gas therein and in fluid communication with the driver cylinder, a lifting mechanism for moving the driver blade to the ready position, a motor coupled to the lifting mechanism, the motor driving the lifting mechanism, an onboard air compressor driven by the motor, wherein the onboard air compressor is driven while the lifting mechanism is driven, and a feed system in fluid communication with the onboard air compressor, wherein the feed system includes a primary feed mechanism adjacent the nosepiece and a secondary feed mechanism adjacent the nosepiece, wherein the primary feed mechanism and the secondary feed mechanism are actuated by compressed air received from the onboard air compressor.

The present disclosure provides, in another aspect, a powered fastener driver includes a housing, a nosepiece extending from the housing, a driver blade movable within the nosepiece between a ready position and a driven position, a piston coupled to the driver blade for movement therewith, a driver cylinder within which the piston is movable, a storage chamber cylinder containing pressurized gas therein and in fluid communication with the driver cylinder, a lifting mechanism for moving the driver blade to the ready position, a motor coupled to the lifting mechanism, the motor driving the lifting mechanism, an onboard air compressor driven by the motor, wherein the onboard air compressor is driven while the lifting mechanism is driven, a fastener feed mechanism adjacent the nosepiece and in fluid communication with the onboard air compressor, wherein the fastener feed mechanism is actuated by compressed air from the onboard air compressor to feed fasteners into a fastener driving channel within the nosepiece, and a button cap feed mechanism adjacent the nosepiece and in fluid communication with the onboard air compressor, wherein the button cap feed mechanism is actuated by compressed air from the onboard air compressor to feed button caps into a position ahead of the fastener driving channel to allow fasteners to be driven therethrough during operation of the powered fastener driver.

The present disclosure provides, in yet another aspect, a method of operating a powered fastener driver that includes energizing a motor, releasing a driver blade to drive a fastener into a workpiece, closing a solenoid valve coupled to an onboard air compressor, driving the onboard air compressor to provide compressed air into a feed system, actuating a primary feed mechanism with compressed air from the onboard air compressor, actuating a secondary feed mechanism with compressed air from the onboard air compressor, and returning a driver blade to a ready position.

Other features and aspects of the disclosure will become apparent by consideration of the following detailed description and accompanying drawings.

Figure 1:
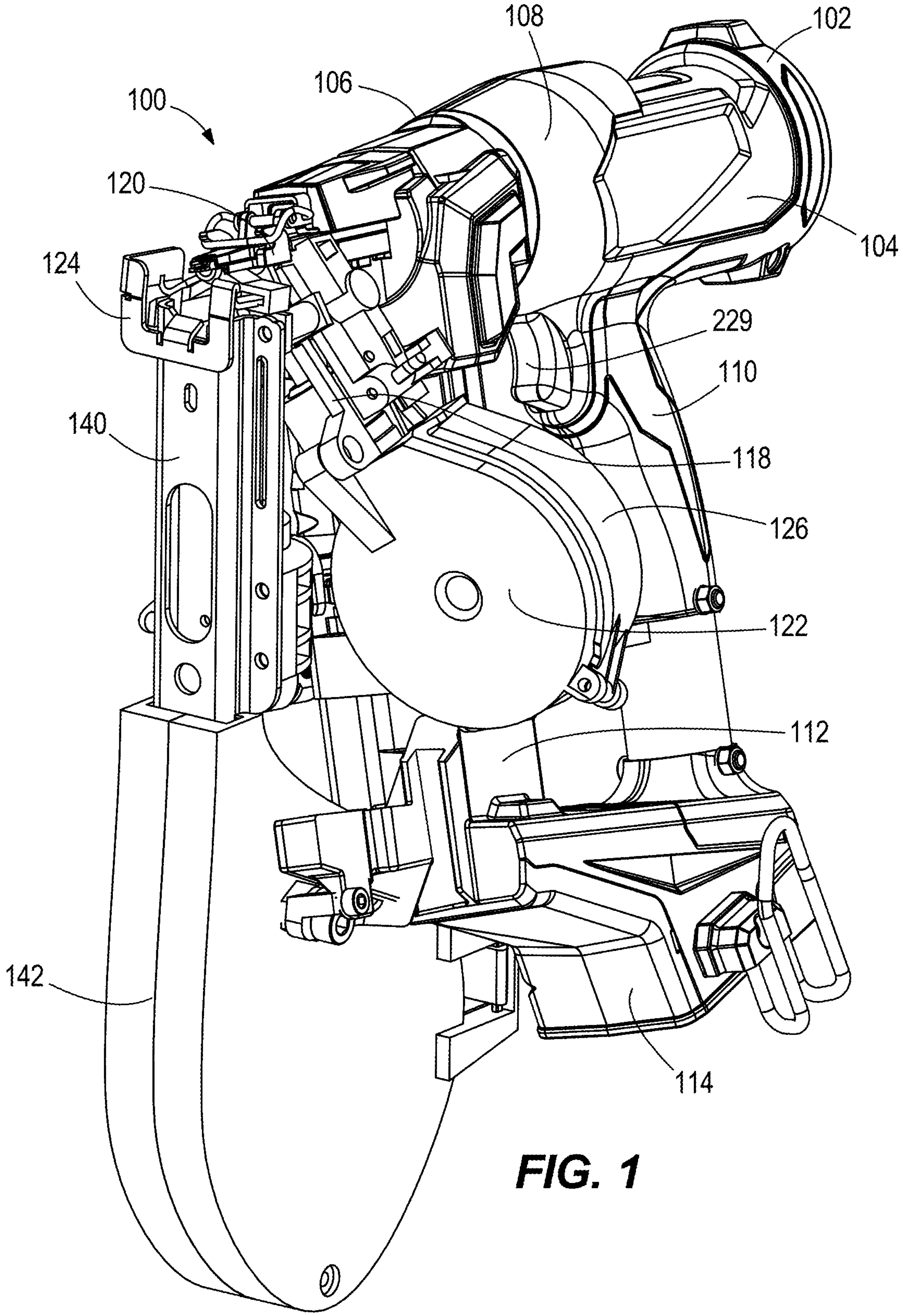
FIG. 1 is perspective view of a gas-spring powered fastener driver.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting.

DETAILED DESCRIPTION

Referring to FIGS. 1-8, a gas spring-powered fastener driver 100 is illustrated. The gas-spring powered fastener driver 100 is operable to drive fasteners, such as nails from a collated roll or coil, into a workpiece while simultaneously delivering button caps. Each button cap is placed ahead of the fastener so that the fastener is driven through the button cap. The fastener driver 100 includes a housing 102 having a first housing shell 104 joined to a second housing shell 106. The housing 102 includes a head portion 108 having a handle portion 110 and a drive unit housing portion 112 extending therefrom. The housing 102 also includes a battery receptacle portion 114 that extends between the handle portion 110 and the drive unit housing portion 112 opposite the head portion 108. It is to be understood that the battery receptacle portion 114 is sized and shaped to receive a removable battery pack, thereon or therein.

The gas-spring powered fastener driver 100 further includes a fastener feed portion 118 in front of the drive unit housing portion 112. The fastener feed portion 118 extends from a nosepiece 120 to a fastener magazine receptacle 122. A workpiece contact bracket 124 is slidably disposed on the nosepiece 120. As shown, the fastener magazine receptacle 122 is generally cylindrical and is sized and shaped to receive coiled fasteners therein. A fastener magazine cover 126 is rotatably disposed on the fastener magazine receptacle 122 and provides access to a fastener magazine that may be removably disposed within the fastener magazine receptacle 122. The fastener magazine is a canister magazine which contains a coiled strip of collated nails. Individual fasteners are sequentially loaded from the fastener magazine to the nosepiece 120 via the fastener feed portion 118 during operation of the fastener driver 100.

Figure 2:
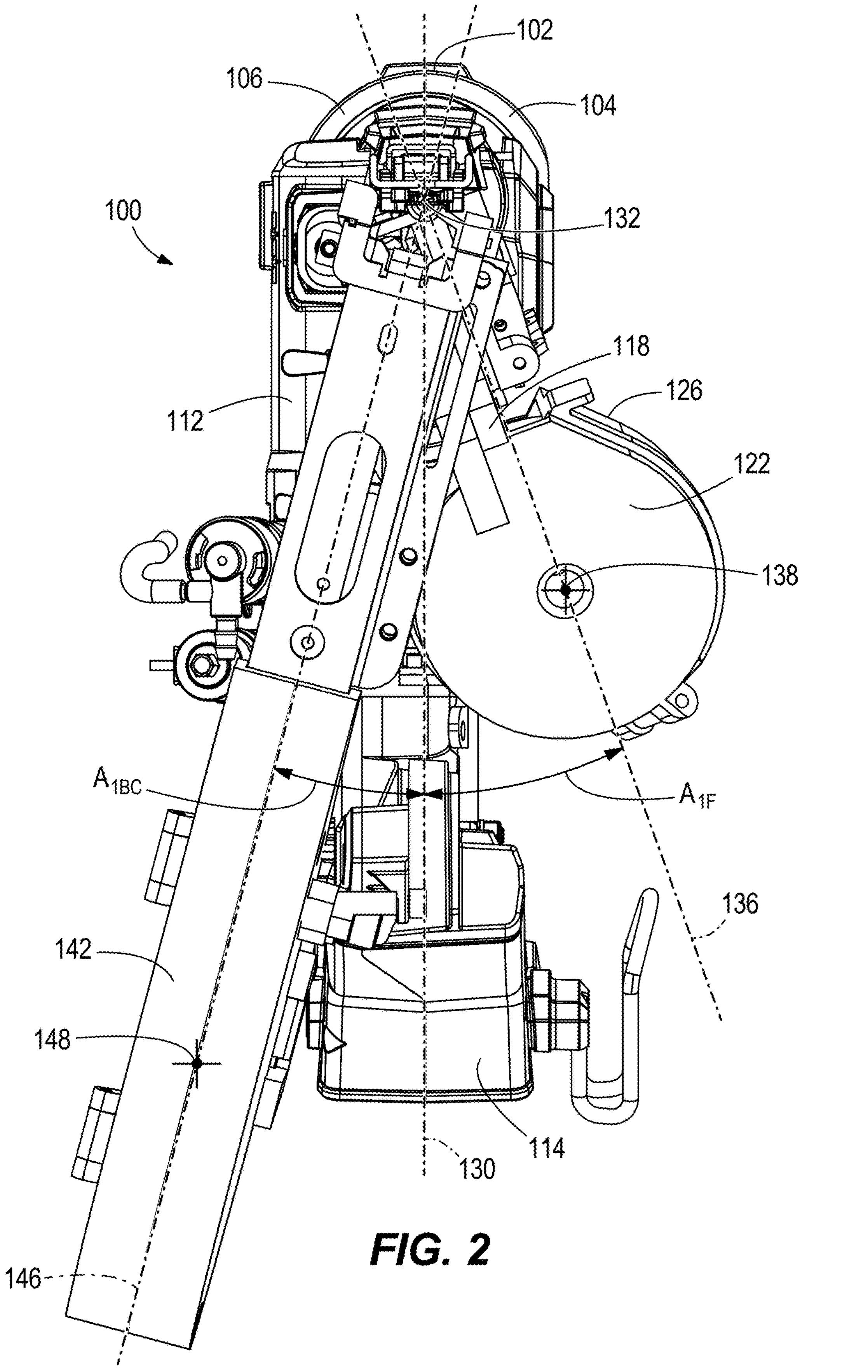
FIG. 2 is a front view of the gas-spring powered fastener driver of FIG. 1.
Figure 3:
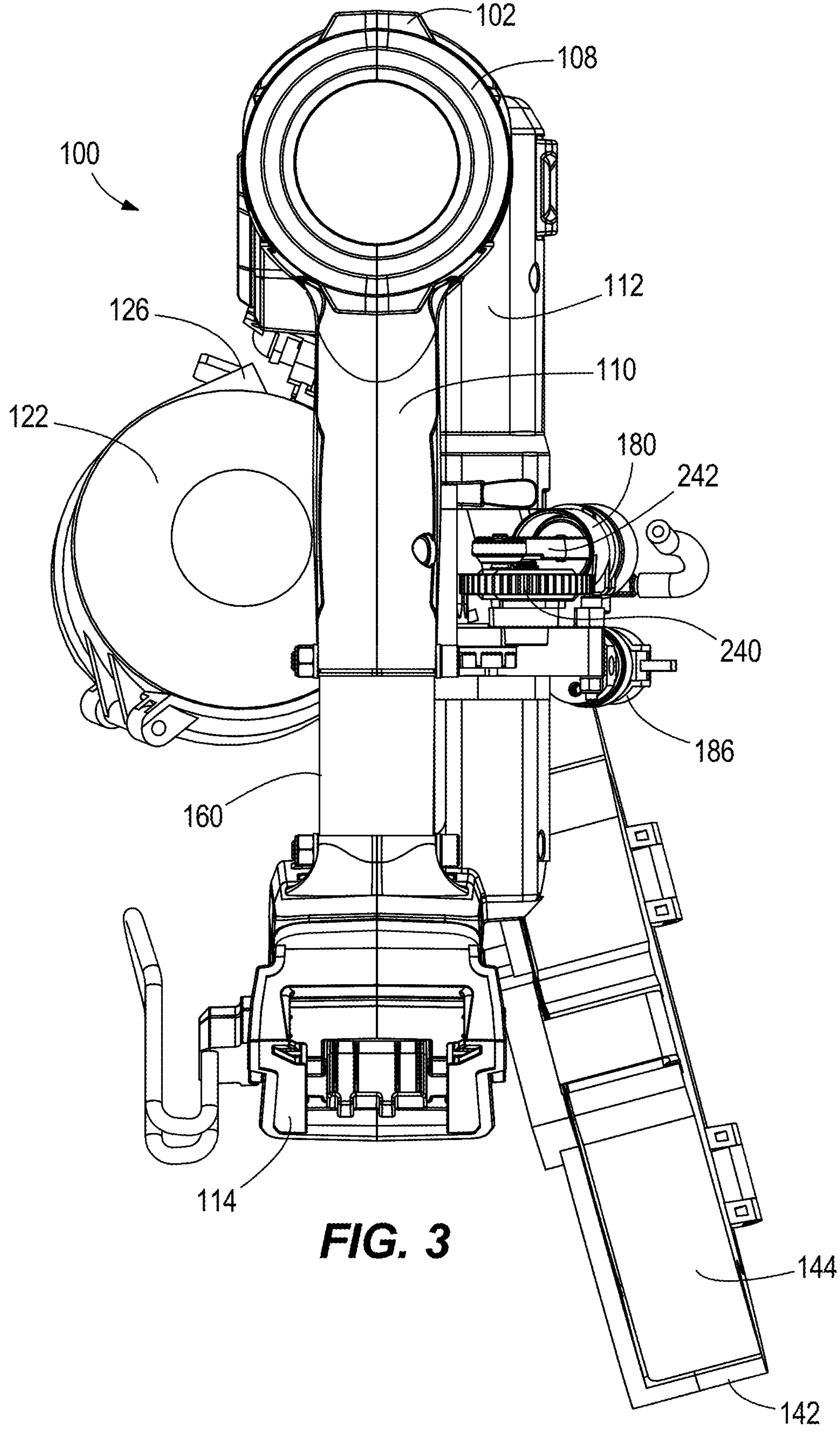
FIG. 3 is a rear view of the gas-spring powered fastener driver of FIG. 1.

As best illustrated in FIG. 2, the fastener feed portion 118 and the fastener magazine receptacle 122 extend from the nosepiece 120 toward a first side of the gas-spring powered fastener driver 100 relative to a central axis 130 that extends through the center 132 of the nosepiece 120. In particular, the fastener feed portion 118 and the fastener magazine receptacle 122 are located on a left side of the gas-spring powered fastener driver 100. Further, a fastener feed axis 136 that extends through the fastener feed portion 118 and the center 138 of the fastener magazine receptacle 122 forms a first fastener feed angle $A_{1F}$ with respect to the central axis 130 of the gas-spring powered fastener driver 100. In a particular aspect, the first fastener feed angle $A_{1F}$ is less than or equal to forty-five degrees (45°), such as less than or equal to forty degrees (40°), less than or equal to thirty-five degrees (35°), less than or equal to thirty degrees (30°), less than or equal to twenty-five degrees (25°), or less than or equal to twenty degrees (20°). Further, the first fastener feed angle $A_{1F}$ is greater than or equal to five degrees (5°), such as greater than or equal to ten degrees (10°), or greater than or equal to fifteen degrees (15°). It is to be understood that, in another aspect, the first fastener feed angle $A_{1F}$ is within a range between, and including, any of the maximum or minimum values of the first fastener feed angle $A_{1F}$ described herein.

The gas-spring powered fastener driver 100 also includes a button cap feed portion 140 in front of the fastener feed portion 118 and in front of the nosepiece 120 to deliver button caps in front of the nosepiece 120 so that fasteners are driven through the button caps as the fasteners are driven into a workpiece. The button cap feed portion 140 extends from the nosepiece 120 to a button cap magazine receptacle 142. The button cap magazine receptacle 142 is generally elliptical and is sized and shaped to receive a coil of button caps therein. A button cap magazine cover 144 is rotatably disposed on the button cap magazine receptacle 142 and provides access to a button cap magazine that may be removably disposed within the button cap magazine receptacle 142. The button cap magazine is a spool which contains a wound strip of collated button caps that are tangentially connected to each other in a continuous ribbon. Individual button caps are sequentially loaded from the button cap magazine in front of the nosepiece 120 via the button cap feed portion 140 during operation of the gas-spring powered fastener driver 100.

As best illustrated in FIG. 2, the button cap feed portion 140 and the button cap magazine receptacle 142 extend from the nosepiece 120 toward a second side of the gas-spring powered fastener driver 100 relative to the central axis 130 opposite the fastener feed portion 118 and the fastener magazine receptacle 122. In particular, the button cap feed portion 140 and the button cap magazine receptacle 142 are located on a right side of the gas-spring powered fastener driver 100. Further, a button cap feed axis 146 that extends through the button cap feed portion 140 and the center 148 of the button cap magazine receptacle 142 forms a first button cap feed angle $A_{1BC}$ with respect to the central axis 130 of the gas-spring powered fastener driver 100. In a particular aspect, the first button cap feed angle $A_{1BC}$ is less than or equal to thirty degrees (30°), such as less than or equal to twenty-five degrees (25°), less than or equal to twenty degrees (20°), or less than or equal to fifteen degrees (15°). Further, the first button cap feed angle $A_{1BC}$ is greater than or equal to two degrees (2°), such as greater than or equal to five degrees (5°), greater than or equal to seven degrees (7°), or greater than or equal to ten degrees (10°). It is to be understood that, in another aspect, the first button cap feed angle $A_{1BC}$ is within a range between, and including, any of the maximum or minimum values of the first button cap feed angle $A_{1BC}$ described herein.

Figure 4:
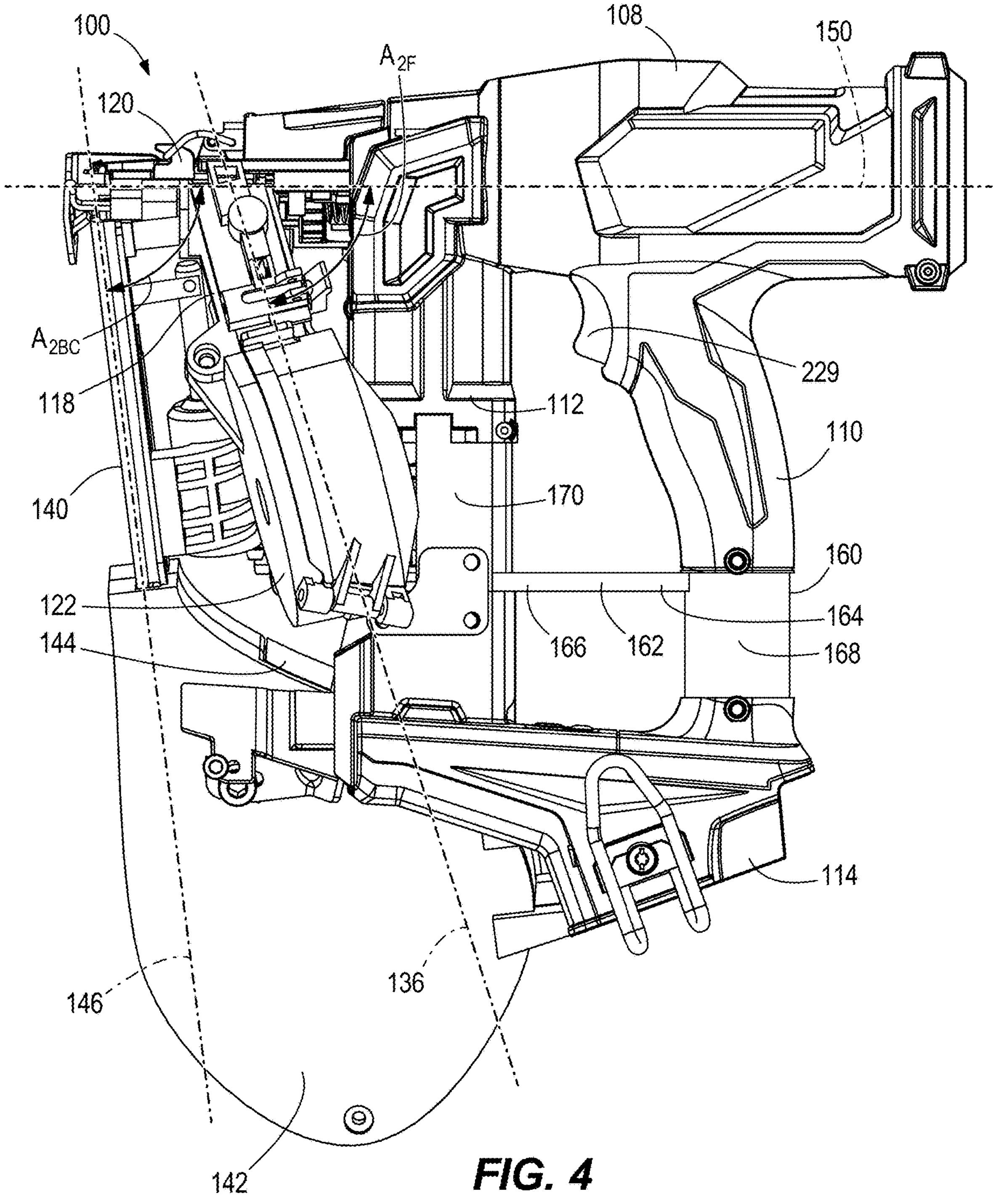
FIG. 4 is a left side view of the gas-spring powered fastener driver of FIG. 1.

As shown in FIG. 4, the gas-spring powered fastener driver 100 further defines a drive axis 150 along which fasteners are driven from the gas-spring powered fastener driver 100 into a workpiece. The fastener feed axis 136 that extends through the fastener feed portion 118 and the fastener magazine receptacle 122 forms a second fastener feed angle $A_{2F}$ with respect to the drive axis 150 of the gas-spring powered fastener driver 100. In a particular aspect, the second fastener feed angle $A_{2F}$ is greater than or equal to sixty degrees (60°), such as greater than or equal to sixty-five degrees (65°), greater than or equal to seventy degrees (70°), or greater than or equal to seventy-three degrees (73°). Further, the second fastener feed angle $A_{2F}$ is less than or equal to eighty-five degrees (85°), such as less than or equal to eighty degrees (80°), or less than or equal to seventy-five degrees (75°). It is to be understood that, in another aspect, the second fastener feed angle $A_{2F}$ is within a range between, and including, any of the minimum or maximum values of the second fastener feed angle $A_{2F}$ described herein.

Moreover, the button cap feed axis 146 that extends through the button cap feed portion 140 and the button cap magazine receptacle 142 forms a second button cap feed angle $A_{2BC}$ with respect to the drive axis 150 of the gas-spring powered fastener driver 100. In a particular aspect, the second button cap feed angle $A_{2BC}$ is greater than or equal to seventy degrees (70°), such as greater than or equal to seventy-five degrees (75°), greater than or equal to eighty degrees (80°), or greater than or equal to eighty-three degrees (83°). Further, the second button cap feed angle $A_{2BC}$ is less than or equal to ninety degrees (90°), such as less than or equal to eighty-seven degrees (87°), or less than or equal to eighty-five degrees (85°). It is to be understood that, in another aspect, the second button cap feed angle $A_{2BC}$ is within a range between, and including, any of the minimum or maximum values of the second button cap feed angle $A_{2BC}$ described herein.

Figure 5:
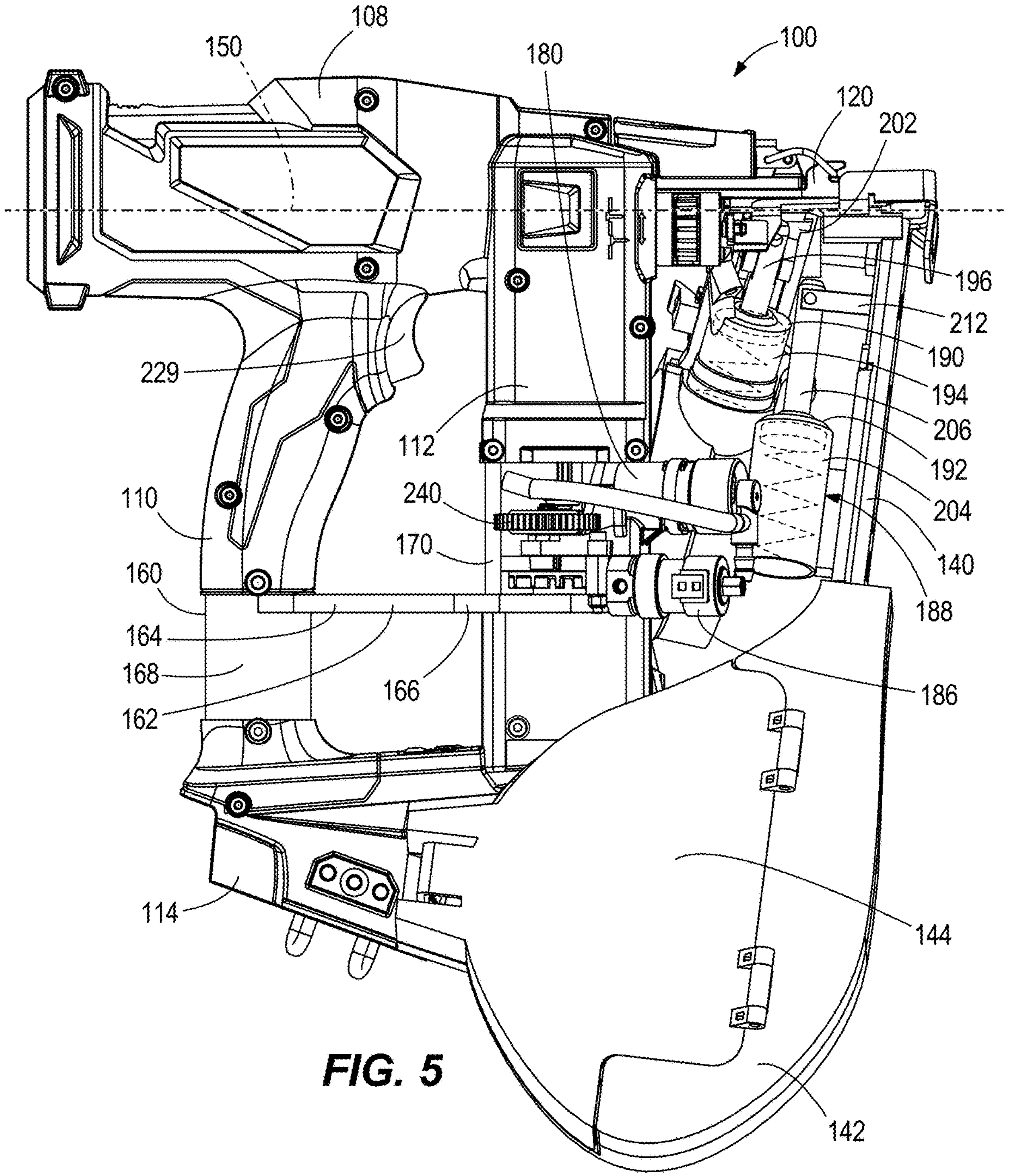
FIG. 5 is a right side view of the gas-spring powered fastener driver of FIG. 1.
Figure 6:
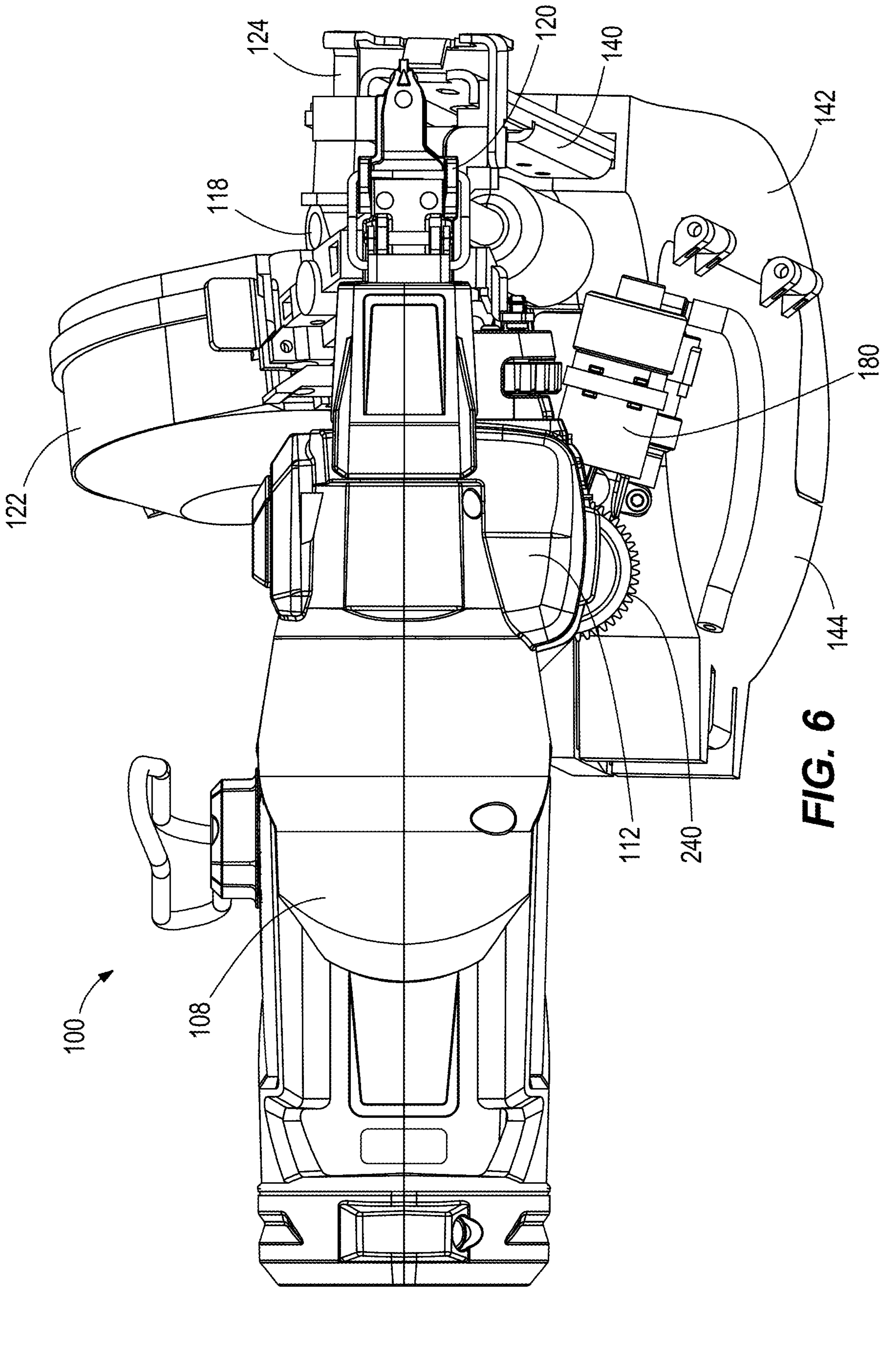
FIG. 6 is a top view of the gas-spring powered fastener driver of FIG. 1.

As best illustrated in FIGS. 4 and 5, the gas-spring powered fastener driver 100 includes an intermediate support frame 160 that extends between the handle portion 110 and a drive unit housing portion 112. Specifically, the intermediate support frame 160 includes a support arm 162 that extends substantially parallel to the drive axis 150. The support arm 162 includes a first end 164 and a second end 166. A first collar 168 is affixed to, or otherwise extends from, the first end 164 of the support arm 162 and extends at least partially around the handle portion 110. A second collar 170 is affixed to, or otherwise extends from, the second end 166 of the support arm 162 and extends at least partially around the drive unit housing portion 112.

The second collar 170 of the intermediate support frame 160 provides support for an onboard air compressor 180 that is disposed between a motor 182 (e.g., a brushless direct current (BLDC) motor) and a gear box 184. Further, the intermediate support frame 160 supports a solenoid valve 186 that is below and adjacent the onboard air compressor 180 and in fluid communication with the onboard air compressor 180. The onboard air compressor 180 is also in fluid communication with a feed system 188 that includes at least a primary feed mechanism, e.g., a fastener feed mechanism 190, and a secondary feed mechanism, e.g., a button cap feed mechanism 192, that are actuated by compressed air from the onboard air compressor 180. The feed system 188 feeds primary deliverables, e.g., fasteners, via the fastener feed mechanism 190, and secondary deliverables, e.g., button caps, via the button cap feed mechanism 192.

The fastener feed mechanism 190 includes a fastener feed cylinder 194 and a fastener feed piston 196. Moreover, the fastener feed mechanism 190 includes a fastener feed piston head 198 coupled to the fastener feed piston 196 and a fastener feed spring 200 between the fastener feed piston head 198 and a bottom of the fastener feed cylinder 194. Accordingly, the fastener feed piston 196 is spring-loaded and moves between a fastener retrieval position when compressed air fills the fastener feed cylinder 194 and compresses the fastener feed spring 200 and a ready position, or fastener feed position, (to deliver a fastener) when air pressure is released from the feed system 188 and the fastener feed spring 200 decompresses. The fastener feed piston 196 is coupled to a fastener advancer 202 that moves down along the collated fasteners to engage the next fastener and move it into position within the fastener driving channel of the nosepiece 120 as the spring-loaded fastener feed piston 196 returns to the ready position. The fastener advancer 202 is coupled to an end of the fastener feed piston 196 opposite the fastener feed piston head 198.

The button cap feed mechanism 192 includes a button cap feed cylinder 204 and a button cap feed piston 206. The button cap feed mechanism 192 also includes a button cap feed piston head 208 coupled to the button cap feed piston 206 and a button cap feed spring 210 between the button cap piston head 208 and a bottom of the button cap feed cylinder 204. Accordingly, the button cap feed piston 206 is spring-loaded and moves between a button cap retrieval position when compressed air fills the button cap feed cylinder 204 and compresses the button cap feed spring 210 and a ready position, or button cap feed position, (to deliver a button cap) when air pressure is released from the feed system 188 and the button cap feed spring 210 decompresses. The button cap feed piston 206 is coupled to a button cap advancer 212 that moves down along the collated button caps to engage the next button cap and move it into position ahead of the nosepiece 120 and the fastener driving channel as the spring-loaded button cap feed piston 206 returns to the ready position. The button cap advancer 212 is coupled to an end of the button cap feed piston 206 opposite the button cap feed piston head 208.

Figure 7:
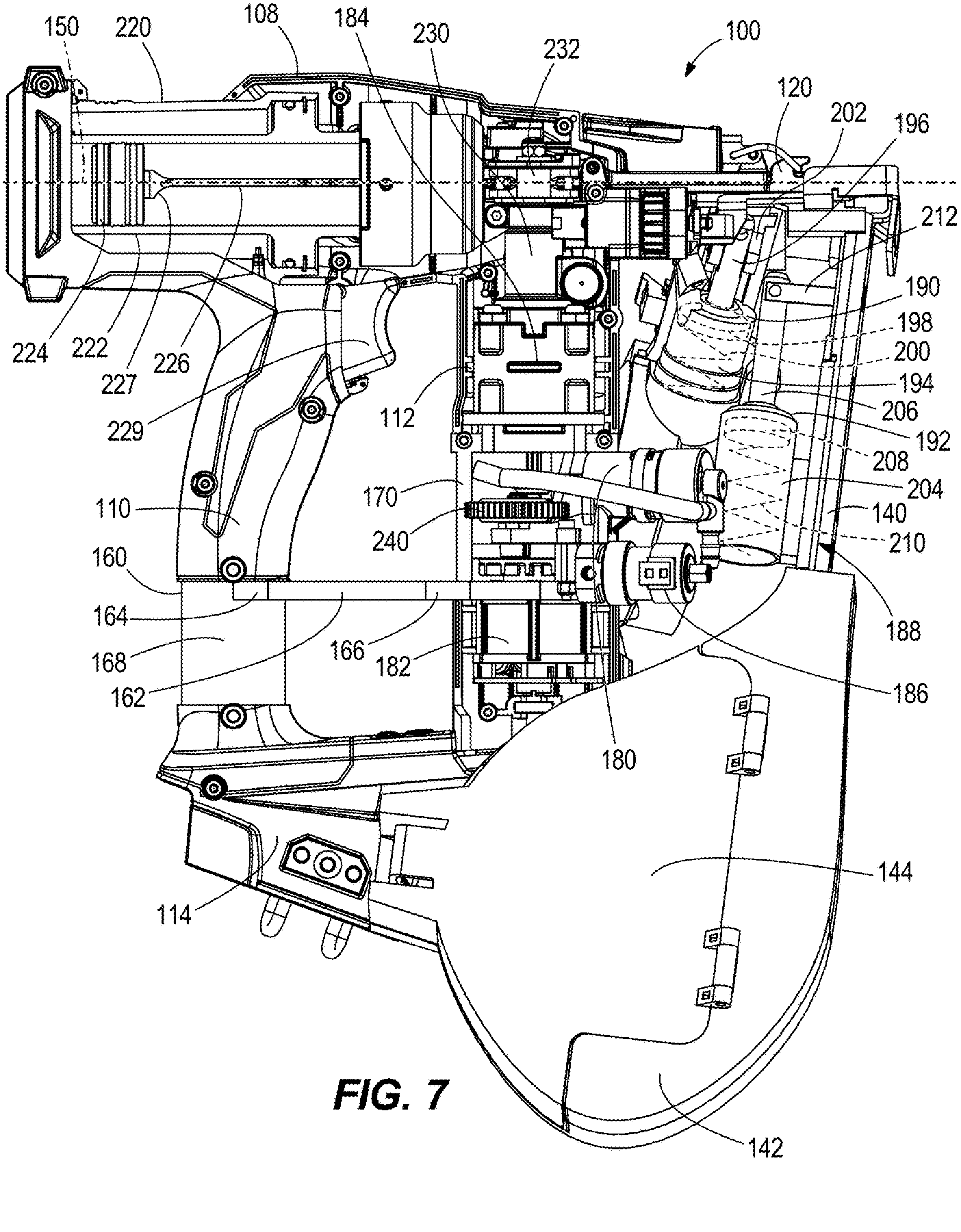
FIG. 7 is another right side view of the gas-spring powered fastener driver of FIG. 1 with portions removed for clarity.
Figure 8:
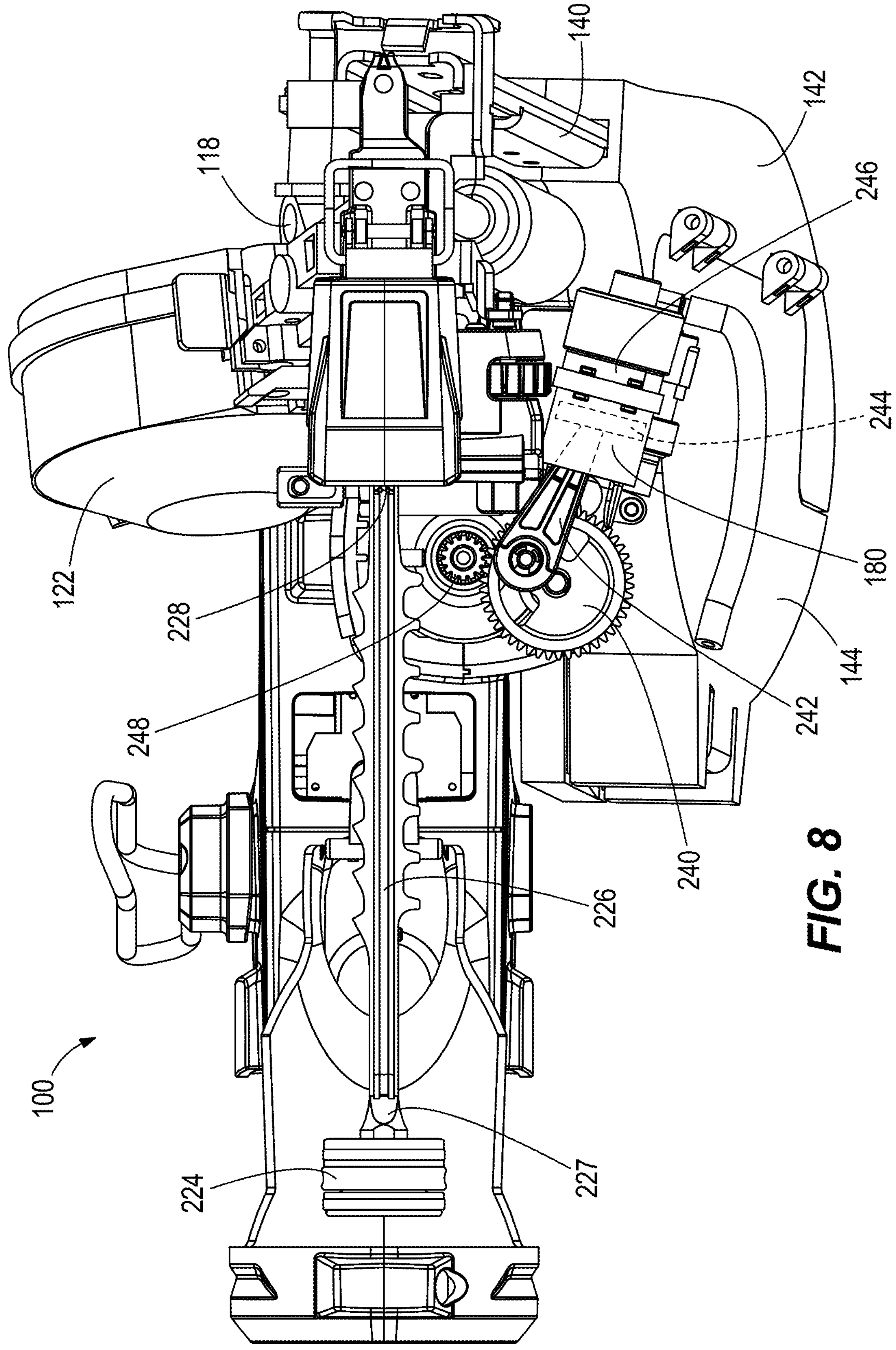
FIG. 8 is another top view of the gas-spring powered fastener driver of FIG. 1. with portions removed for clarity.

FIGS. 7 and 8 show that the gas-spring powered fastener driver 100 further includes a storage chamber cylinder 220 disposed within the head portion 108 of the housing 102. The storage chamber cylinder 220 includes a driver cylinder 222 disposed therein. Further, a moveable piston 224 is slidably disposed within the driver cylinder 222. A driver blade 226 is connected to the moveable piston 224. As shown, the driver blade 226 includes a proximal end 227 and a distal end 228. The proximal end 227 of the driver blade 226 is connected to the moveable piston 224. The distal end 228 of the driver blade 226 is located adjacent the nosepiece 120 when the moveable piston 224 is moved to a top dead center (TDC) (i.e., retracted or ready) position within the driver cylinder 222 and the gas-spring powered fastener driver 100 is ready to be fired. Upon firing, e.g., when a trigger 229 in the handle portion 110 is depressed or otherwise toggled and sends a signal to a controller, the distal end 228 of the driver blade 226 is moved into the nosepiece 120 to drive a fastener from within the nosepiece 120, through a button cap, and into a workpiece until the moveable piston 224 reaches a bottom dead center (BDC) (i.e., extended or driven) position within the driver cylinder 222.

The gas-spring powered fastener driver 100 further includes a lifting mechanism 230 that is operably coupled to the motor 182 via the gear box 184. The lifting mechanism 230 includes a rotating lifter 232 that selectively engages the driver blade 226. The lifting mechanism 230, and the rotating lifter 232, is driven by the motor 182 to move the driver blade 226 from a fired position to a ready position and in the process move the piston 224 from the BDC position to the TDC position. Moreover, as the motor 182 drives the lifting mechanism 230 it also drives the onboard air compressor 180 to provide air to the fastener feed mechanism 190 and the button cap feed mechanism 192.

FIG. 8 shows that the onboard air compressor 180 includes a compressor gear 240 with a first end of a connecting rod 242 attached thereto. A compressor piston 244 is connected to a second end of the connecting rod 242 and reciprocates within a piston cylinder 246 as the compressor gear 240 rotates and drives the connecting rod 242. As further shown, the compressor gear 240 is engaged with a drive gear 248 on the motor 182. As such, as the motor 182 rotates to return the piston 224 to the TDC position and the driver blade 226 to a ready position, the drive gear 248 drives the compressor gear 240 to reciprocate the compressor piston 244 within the onboard air compressor 180 to provide compressed air to the components that are in fluid communication with the onboard air compressor 180.

Figure 9:
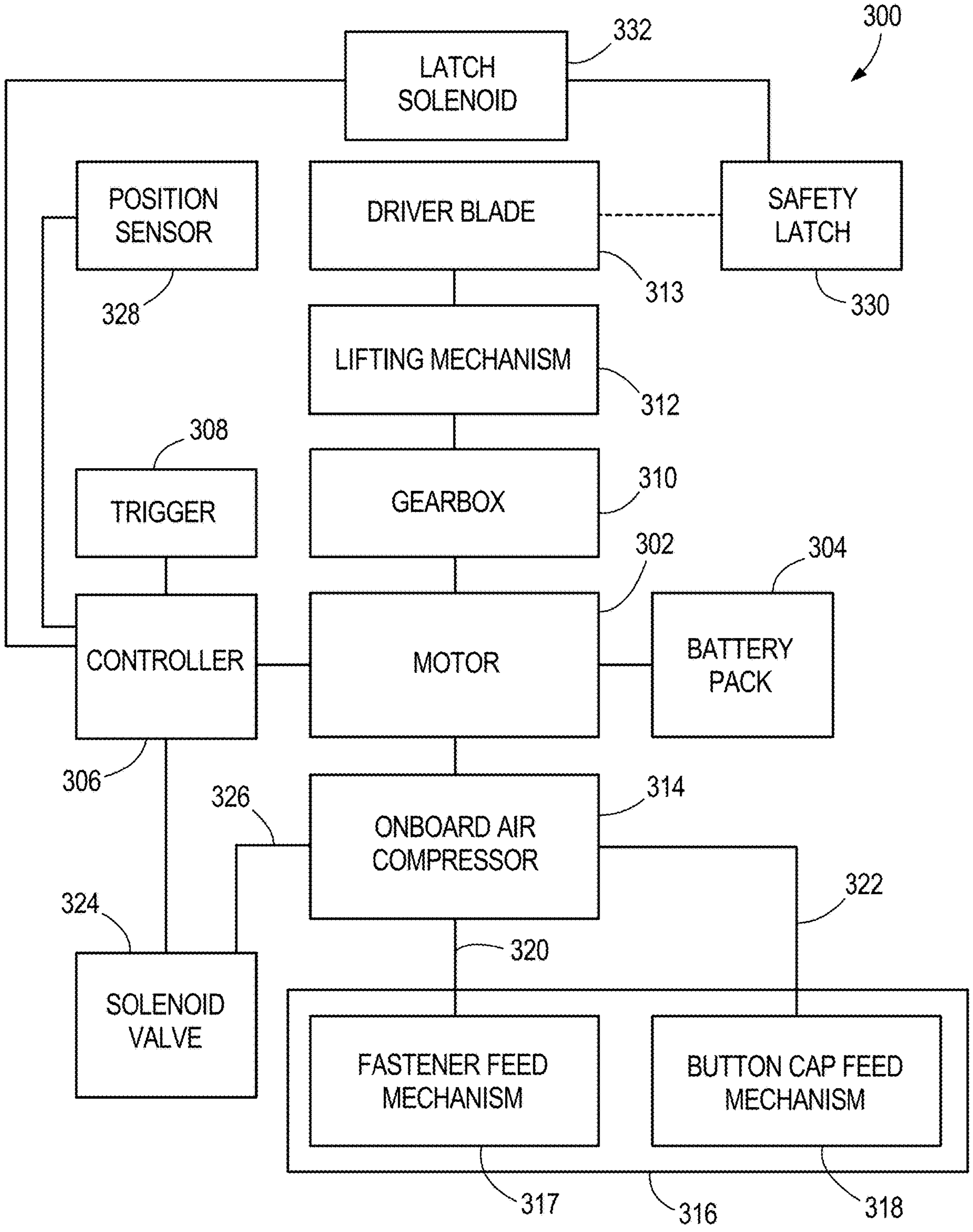
FIG. 9 is a schematic diagram of the gas-spring powered fastener driver of FIG. 1.

Referring to FIG. 9, a schematic of a gas-spring powered fastener driver 300 is illustrated. It is to be understood that the schematic of the gas-spring powered fastener driver 300 is a schematic representation of the gas-spring powered fastener driver 100 illustrated above and where applicable, like parts, while not numbered the same as above, are the same. For example, the motor 302 is the same as the motor 182 disclosed above, the onboard air compressor 314 is the same as the onboard air compressor 180 disclosed above, etc.

As shown, the gas-spring powered fastener driver 300 includes a motor 302. A battery pack 304 is operably coupled to the motor 302. A controller 306 is also operably coupled to the motor 302 and a trigger 308 is operably coupled to the controller 306. When the trigger 308 is toggled, depressed, or otherwise activated, the controller 306 receives a signal therefrom and in response, activates the motor 302. As shown, a gear box 310 is operably coupled to the motor 302 and a lifting mechanism 312 is operably coupled to the gear box 310. Thus, when the motor 302 is activated, it transmits rotary motion through the gear box 310 to the lifting mechanism 312 in order to move a driver blade 313 from a driven position to a ready position.

An onboard air compressor 314 is also operably coupled to the motor 302. A feed system 316 having a fastener feed mechanism 317 and a button cap feed mechanism 318 is in fluid communication with the onboard air compressor 314 via a first air line 320 and a second air line 322. Specifically, the fastener feed mechanism 317 is in fluid communication with the onboard air compressor 314 via the first air line 320 and the button cap feed mechanism 318 is in fluid communication with the onboard air compressor 314 via the second air line 322. As further shown in FIG. 9, a solenoid valve 324 is in fluid communication with the onboard air compressor 314 via a third air line 326. Accordingly, when the motor 302 is activated to rotate the lifting mechanism 312 and move the driver blade from the driven position to the ready position, the motor 302 also drives the onboard air compressor 314 to provide compressed air to the fastener feed mechanism 317 and the button cap feed mechanism 318. When the motor 302 is activated, the controller 306 sends a signal to the solenoid valve 324 to close the solenoid valve 324. As such, the onboard air compressor 314 builds air pressure within the fastener feed mechanism 317 and the button cap feed mechanism 318. When the driver blade reaches a ready position (TDC), the motor 302 stops and the controller 306 sends a signal to the solenoid valve 324 to open the solenoid valve 324 and release air pressure to the surrounding atmosphere.

FIG. 9 also shows that the gas-spring powered fastener driver 300 includes a position sensor 328 adjacent the driver blade 313 to detect the position of the driver blade 313 and a safety latch 330 adjacent the driver blade 313 to selectively engage and prevent the driver blade 313 from being driven. The safety latch 330 is operably coupled to a latch solenoid 332. The position sensor 328 and the latch solenoid 332 are operably coupled to the controller 306 to send, or receive, signals to or from the controller 306. In the event the controller 306 detects that the driver blade 313 is not returned to the ready position, the gas-spring powered fastener driver 300 enters a jam clearing mode in which the motor 302 is rotated with the latch solenoid 332 is de-energized and the safety latch 330 is engaged with the driver blade 313. Further, in the jam clearing mode air is not provided to the feed system 316 to prevent an additional fastener and button cap from being fed into their respective ready positions.

Figure 10:
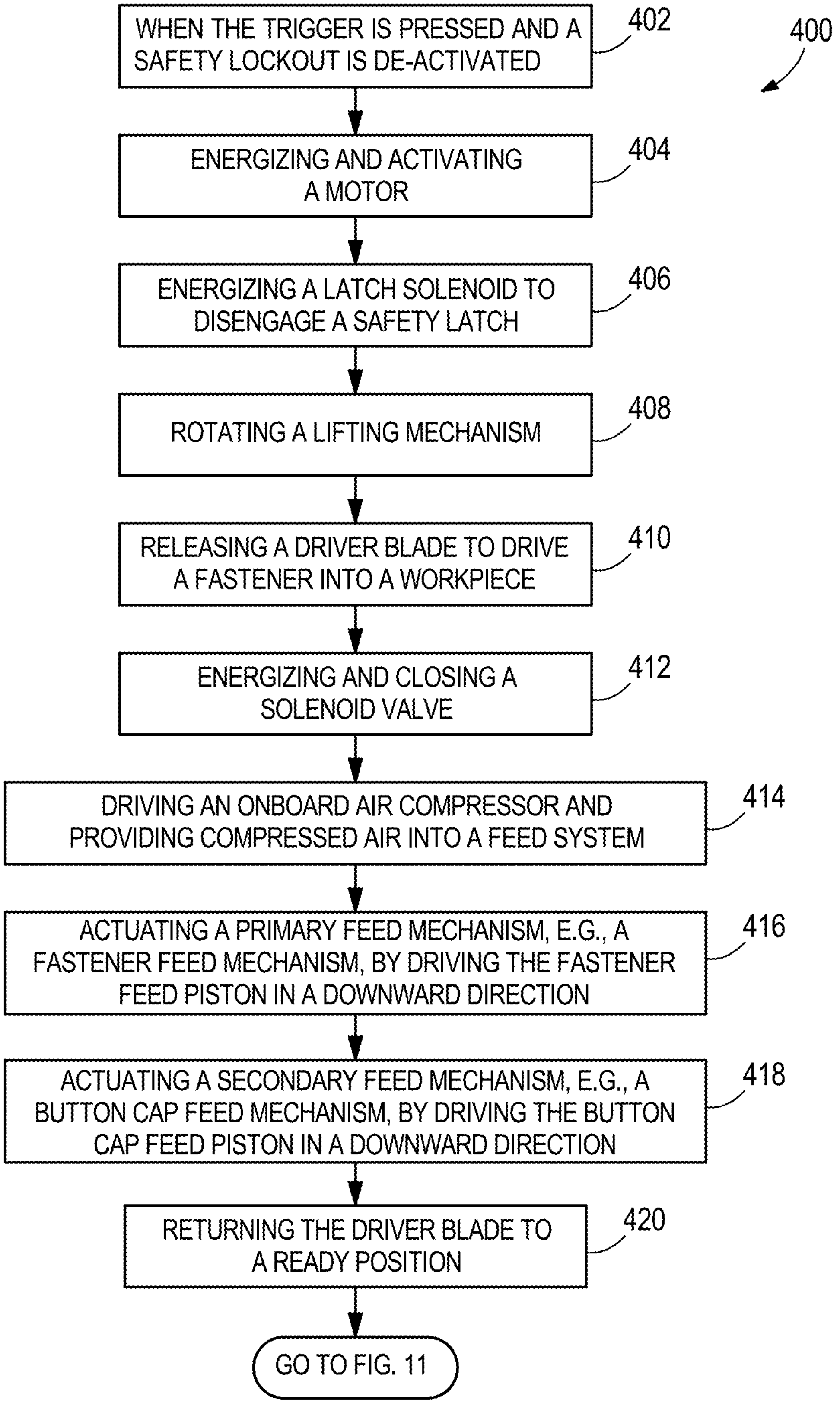
FIG. 10 is a flow chart illustrating a first portion of a method of operating the gas-spring powered fastener driver of FIG. 1.
Figure 11:
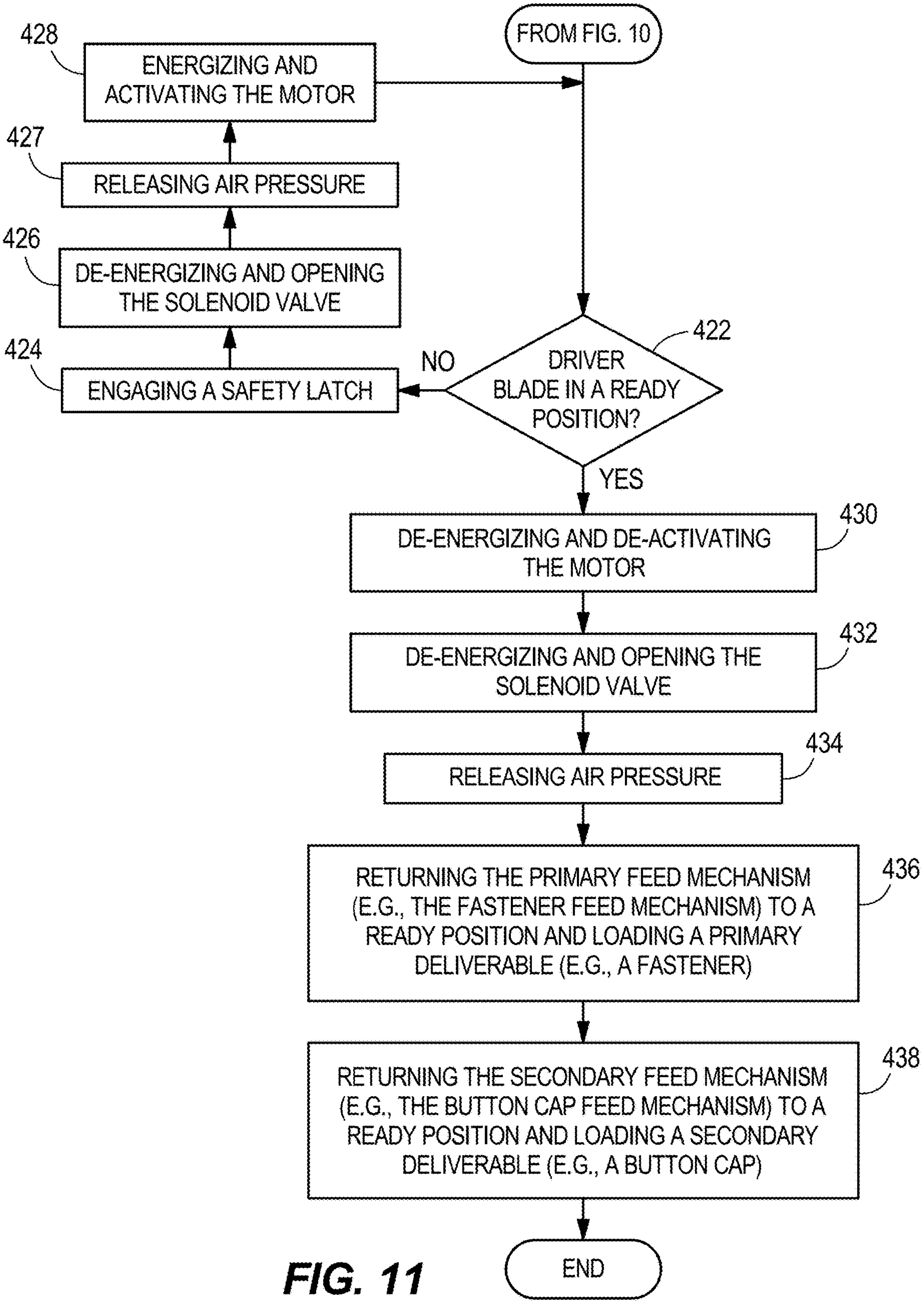
FIG. 11 is a flow chart illustrating a second portion of a method of operating the gas-spring powered fastener driver of FIG. 1.

FIGS. 10 and 11 are a flow chart illustrating a method 400 of operating a gas-spring powered fastener driver, e.g., the gas-spring powered fastener driver 100 described herein. At block 402 of FIG. 10, the method 400 commences when the trigger on a gas-spring powered fastener driver is pressed, toggled, depressed, or otherwise actuated and a safety lockout is de-activated. The safety lockout is located on a sliding workpiece contact bracket and includes a magnet the presence of which is detected, or not detected, by a Hall sensor. At block 404, in response to the trigger being pressed and the safety lockout being de-activated, the method 400 includes energizing and activating a motor. At block 406, the method 400 includes energizing a latch solenoid to disengage a safety latch. At block 408, the method 400 includes rotating a lifting mechanism and at block 410, the method 400 includes releasing a driver blade to drive a fastener into a workpiece. Simultaneously, at block 412, the method 400 includes energizing and closing a solenoid valve. Thereafter, at block 414, the method 400 includes driving an onboard air compressor and providing compressed air into the feed system.

At block 416, the method 400 includes actuating a primary feed mechanism, e.g., a fastener feed mechanism, by driving the fastener feed piston in a downward direction in response to the increased air pressure provided by the onboard air compressor. Moreover, at block 418, the method 400 includes actuating a secondary feed mechanism, e.g., a button cap feed mechanism, by driving the button cap feed piston in a downward direction in response to the increased air pressure provided by the onboard air compressor. At block 420, the method 400 further includes returning the driver blade to a ready position by continuing to rotate the lifting mechanism. Thereafter, the method 400 proceeds to decision 422 of FIG. 11.

Moving to decision 422 of FIG. 11, the method 400 includes detecting, or otherwise determining, whether the driver blade is in a ready position. The position of the driver blade is determined using a magnet and a Hall sensor. The magnet can be disposed on a lifter of the lifting mechanism and when the angular position of the lifter that corresponds to the driver blade is in the ready position, a corresponding signal is transmitted to a controller. If the driver blade is not in the ready position at decision 422, the method 400 enters a jam clearing mode. Specifically, the method 400 proceeds to block 424 and the method 400 includes engaging a safety latch to prevent the driver blade from moving forward. The safety latch is engaged by de-energizing a latch solenoid. Thereafter, at block 426, the method 400 includes de-energizing and opening the solenoid valve to the feed system to prevent actuating the feed system, e.g., the primary feed mechanism and the secondary feed mechanism. At block 427, the method 400 includes releasing air pressure while the compressor is driven. This prevents more deliverables from being forced into the firing chamber and thereby, prevents nail jamming or the wasting of button caps. At block 428, the method 400 includes energizing and activating the motor in order to return the driver blade to the ready position. Thereafter, the method 400 returns to decision 422.

Returning to decision 422, if the driver blade is in the ready position, the method 400 proceeds to block 430. At block 430, the method 400 includes de-energizing and de-activating the motor. Further, at the same time or substantially the same time, at block 432, the method 400 includes de-energizing and opening the solenoid valve. At block 434, the method 400 includes releasing air pressure from the system (i.e., in response to opening the solenoid). At block 436, the method 400 includes returning the primary feed mechanism, e.g., the fastener feed mechanism, to a ready position and loading a primary deliverable, e.g., a fastener, to the nosepiece of the gas-spring powered fastener driver, e.g., to a fastener driving channel within the nosepiece. The fastener feed mechanism is returned to the ready position when a spring-loaded fastener feed piston within the fastener feed mechanism returns to the ready position when the air pressure is released. At block 438, the method 400 includes returning the secondary feed mechanism, e.g., the button cap feed mechanism, to a ready position and loading a secondary deliverable, e.g., a button cap, e.g., to a position ahead of the fastener driving channel of the nosepiece. The button cap feed mechanism is returned to the ready position when a spring-loaded fastener feed piston within the fastener feed mechanism returns to the ready position when the air pressure is released. Thereafter, the method 400 ends.

Various features of the disclosure are set forth in the following claims.

Although the disclosure has been described in detail with reference to certain preferred embodiments, variations and modifications exist within the scope and spirit of one or more independent aspects of the disclosure as described.

What is claimed is:

1. A powered fastener driver comprising:

a housing;

a nosepiece extending from the housing;

a driver blade movable within the nosepiece between a ready position and a driven position;

a piston coupled to the driver blade for movement therewith;

a driver cylinder within which the piston is movable;

a storage chamber cylinder containing pressurized gas therein and in fluid communication with the driver cylinder;

a lifting mechanism for moving the driver blade to the ready position;

a motor coupled to the lifting mechanism, the motor driving the lifting mechanism;

an onboard air compressor driven by the motor, wherein the onboard air compressor is driven while the lifting mechanism is driven; and a feed system in fluid communication with the onboard air compressor, wherein the feed system includes a primary feed mechanism adjacent the nosepiece and a secondary feed mechanism adjacent the nosepiece, wherein the primary feed mechanism and the secondary feed mechanism are actuated by compressed air received from the onboard air compressor.

2. The powered fastener driver of claim 1, further comprising a fastener feed portion extending from the nosepiece and a fastener magazine receptacle coupled to the fastener feed portion, wherein the fastener magazine receptacle is configured to receive collated fasteners therein.

3. The powered fastener driver of claim 2, wherein the primary feed mechanism comprises a fastener feed mechanism having a fastener feed cylinder and a spring-loaded fastener feed piston therein.

4. The powered fastener driver of claim 3, wherein the spring-loaded fastener feed piston moves between a fastener retrieval position and a fastener feed position in which fasteners are delivered into a fastener driving channel within the nosepiece.

5. The powered fastener driver of claim 4, further comprising a fastener advancer coupled to an end of the spring-loaded fastener feed piston wherein the fastener advancer moves along the collated fasteners to retrieve a next fastener in the fastener retrieval position.

6. The powered fastener driver of claim 1, further comprising a button cap feed portion extending from the nosepiece and a button cap magazine receptacle coupled to the button cap feed portion, wherein the button cap magazine receptacle is configured to receive collated button caps therein.

7. The powered fastener driver of claim 6, wherein the secondary feed mechanism comprises a button cap feed mechanism having a button cap feed cylinder and a spring-loaded button cap feed piston therein.

8. The powered fastener driver of claim 7, wherein the spring-loaded button cap feed piston moves between a button cap retrieval position and a button cap feed position in which button caps are delivered into a fastener driving channel within the nosepiece.

9. The powered fastener driver of claim 8, further comprising a button cap advancer coupled to an end of the spring-loaded button cap feed piston wherein the button cap advancer moves along the collated button caps to retrieve a next button cap in the button cap retrieval position.

10. A powered fastener driver comprising:

a housing;

a nosepiece extending from the housing;

a driver blade movable within the nosepiece between a ready position and a driven position;

a piston coupled to the driver blade for movement therewith;

a driver cylinder within which the piston is movable;

a storage chamber cylinder containing pressurized gas therein and in fluid communication with the driver cylinder;

a lifting mechanism for moving the driver blade to the ready position;

a motor coupled to the lifting mechanism, the motor driving the lifting mechanism;

an onboard air compressor driven by the motor, wherein the onboard air compressor is driven while the lifting mechanism is driven;

a fastener feed mechanism adjacent the nosepiece and in fluid communication with the onboard air compressor, wherein the fastener feed mechanism is actuated by compressed air from the onboard air compressor to feed fasteners into a fastener driving channel within the nosepiece; and a button cap feed mechanism adjacent the nosepiece and in fluid communication with the onboard air compressor, wherein the button cap feed mechanism is actuated by compressed air from the onboard air compressor to feed button caps into a position ahead of the fastener driving channel to allow fasteners to be driven therethrough during operation of the powered fastener driver.

11. The powered fastener driver of claim 10, further comprising a fastener feed portion extending from the nosepiece and a fastener magazine receptacle coupled to the fastener feed portion, wherein the fastener feed mechanism extends along the fastener feed portion to retrieve and deliver fasteners to the nosepiece.

12. The powered fastener driver of claim 11, wherein the fastener feed mechanism comprises a fastener feed cylinder and a spring-loaded fastener feed piston therein and wherein the spring-loaded fastener feed piston moves between a fastener retrieval position in which one of a plurality of collated fasteners is engaged and a fastener feed position in which the one of a plurality of collated fasteners is delivered into the fastener driving channel.

13. The powered fastener driver of claim 12, wherein the spring-loaded fastener feed piston is biased to the fastener retrieval position by compressed air from the onboard air compressor and is biased to the fastener feed position by a spring when the compressed air is released from the fastener feed cylinder.

14. The powered fastener driver of claim 10, further comprising a button cap feed portion extending from the nosepiece and a button cap magazine receptacle coupled to the button cap feed portion, wherein the button cap feed mechanism extends along the button cap feed portion to retrieve and deliver button caps to ahead of the nosepiece.

15. The powered fastener driver of claim 14, wherein the button cap feed mechanism comprises a button cap feed cylinder and a spring-loaded button cap feed piston therein and wherein the spring-loaded button cap feed piston moves between a button cap retrieval position in which one of a plurality of collated button caps is engaged and a button cap feed position in which the one of a plurality of collated button caps is delivered ahead the fastener driving channel.

16. The powered fastener driver of claim 15, wherein the spring-loaded button cap feed piston is biased to the button cap retrieval position by compressed air from the onboard air compressor and is biased to the button cap feed position by a spring when the compressed air is released from the button cap feed cylinder.

17. A method of operating a powered fastener driver, the method comprising:

energizing a motor;

releasing a driver blade to drive a fastener into a workpiece;

closing a solenoid valve coupled to an onboard air compressor;

driving the onboard air compressor to provide compressed air into a feed system;

actuating a primary feed mechanism with compressed air from the onboard air compressor;

actuating a secondary feed mechanism with compressed air from the onboard air compressor; and returning a driver blade to a ready position.

18. The method of claim 17, further comprising:

de-energizing the motor when the driver blade is detected in the ready position; and opening the solenoid valve to release air pressure from the feed system.

19. The method of claim 18, further comprising:

returning the primary feed mechanism to a ready position; and loading a primary deliverable into driver channel of the powered fastener driver.

20. The method of claim 19, further comprising:

returning the secondary feed mechanism to a ready position; and loading a secondary deliverable ahead of the driver channel of the powered fastener driver.

21. The method of claim 17, further comprising:

detecting that the driver blade is not in the ready position;

engaging a safety latch to prevent the driver blade from moving forward;

opening the solenoid valve to prevent air flow to the feed system; and activating the motor.

* * * * *